Figure 1:
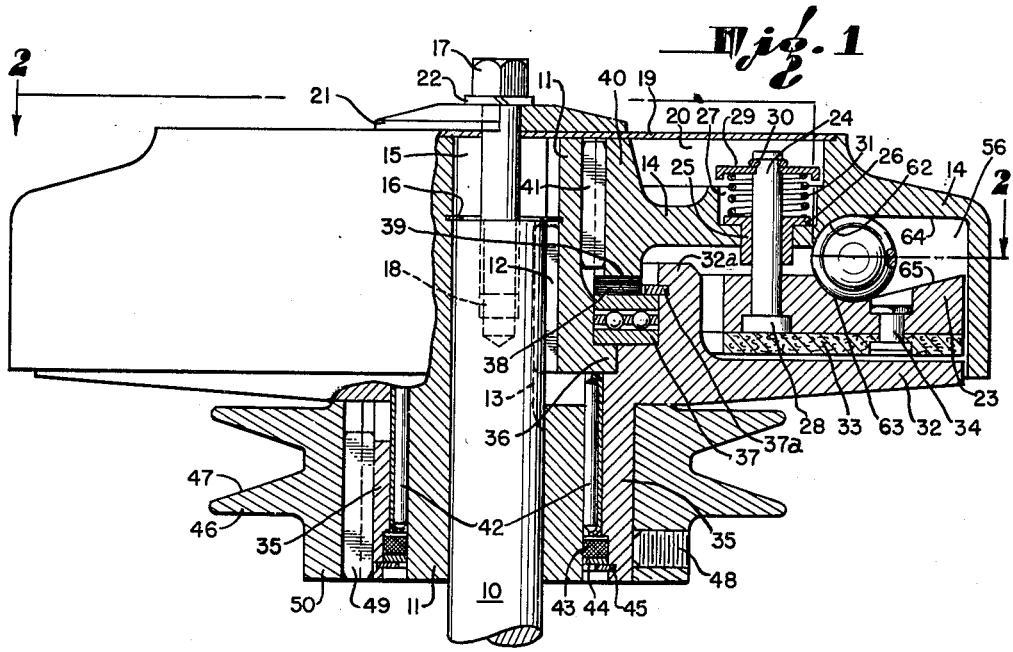

Dec. 13, 1949     A. E. ELMORE     2,491,003

CENTRIFUGAL CLUTCH

Filed June 10, 1946

INVENTOR.
AUSTIN E. ELMORE
BY
ATTORNEY

Patented Dec. 13, 1949

2,491,003

UNITED STATES PATENT OFFICE 2,491,003

CENTRIFUGAL CLUTCH

Austin E. Elmore, Los Angeles, Calif., assignor of one-half to William H. Reely, Los Angeles, Calif., and one-half to Richard V. Fabian, Pine Orchard, Conn.

Application June 10, 1946, Serial No. 675,569

13 Claims. (Cl. 192—105)

1

This invention relates to power transmitting means, and more particularly to a friction clutch device having centrifugally actuated means for automatically connecting and disconnecting rotatable driving and driven elements.

It is an object of the invention to provide a device of this character having new and improved features.

It is another object of the invention to provide a device of this character that is compact, and that is relatively simple in construction and operation.

Still another object of the invention is to provide a device of this character that has an improved centrifugal control element.

A further object of the invention is to provide a device of this character wherein the centrifugal control element is balanced.

A still further object of the invention is to provide a device of this character wherein the driving member or element will attain a suitable speed before the load to be driven is applied thereto.

Still another object of the invention is to provde a device of this character that is smooth and reliable in operation.

Further objects and advantages of the invention will be brought out in the following part of the specification.

Figure 2:
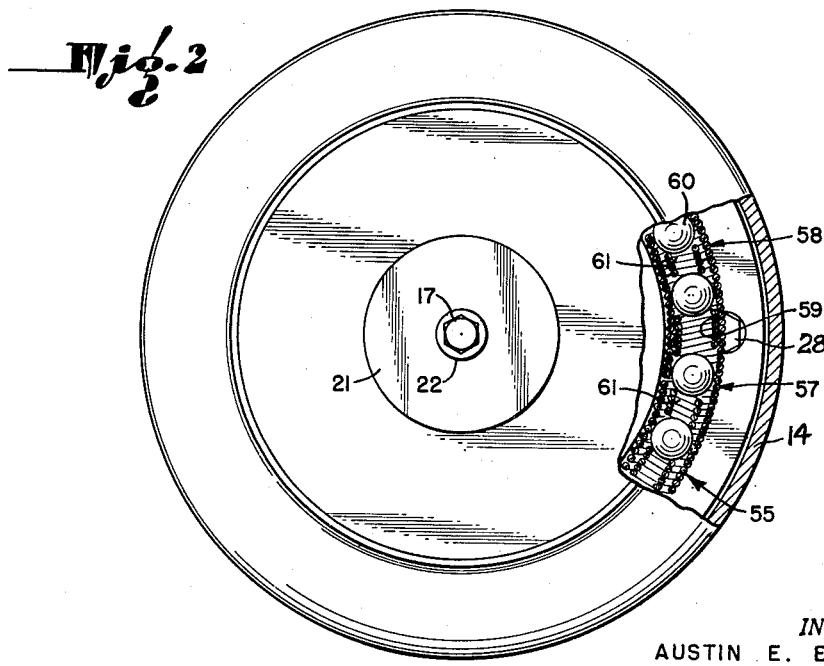

Referring to the drawings, which are for illustrative purposes only,

Fig. 1 is a sectional view partially in section, of a power transmitting mechanism embodying the present invention; and Fig. 2 is a section taken on line 2—2 of Fig. 1.

Referring more particularly to the drawings, there is shown in Figs. 1 and 2 a clutch having a shaft 10 connected with a source of power such as an engine, not shown. On the shaft is a sleeve 11 which is secured thereto against rotary motion by a key 12 received in a keyway 13 in the shaft. A drive plate member 14 is provided and is adapted to rotate with the shaft 10, said plate 14 being in the nature of a fly-wheel and is generally cup-shaped to house other parts of the device, as will be pointed out hereinafter. Within the bore 15 of the sleeve, in which the drive shaft 10 is located, there is a retaining ring 16 adjacent the righthand end of the bore 15 but spaced therefrom, as shown in Fig. 1, said ring 16 being received in a groove provided therefor in said sleeve. The adjacent end of the shaft 10 abuts against the retaining ring 16 and the drive plate 14 is secured to the shaft and sleeve by an assembly screw 17 which is threaded into a bore 18,

2 extending axially from the adjacent end of said shaft 10. A dust cover or plate 19 is secured to the top end of the drive plate, as shown in Figs. 1 and 3, and defines one wall of a chamber 20. The dust plate 19 is secured to the drive plate by the assembly screw 17 and interposed between the head of said screw and cover 19 is a shaft washer 21 and a lock washer 22.

Housed within the drive plate 14 is a center plate 23 which is supported by the drive plate and is adapted to shift axially but to rotate with said drive plate. The means for supporting the center plate 23 comprises a plurality of annularly spaced drive pins 24 slidable in bushings 25 received in openings provided therefor in the drive plate. The bushings have outwardly or radially extending annular flanges 26 which abut against the bottom of the recesses 27, which form enlarged extensions in the openings in the drive plate which receive the bushings.

One end of each of the pins 24 is provided with an enlarged head 28 received in a recess provided therefor in the center plate 23. The opposite end of each pin 24 carries a spring retainer washer or cap 29 secured to the pin 24 by any suitable means such as a cotter pin 30. The spring retainer 29 is spaced from the flange 26 of the bushing 25 and a spring 31, disposed about the pin 24, reacts between the spring retainer 29 and the flange 26 to urge the pin upwardly, as shown in Fig. 1, to thereby urge the center plate 23 in the same direction and out of engagement with a rotatable driven element or pulley plate 32, there being a suitable lining 33 secured to the center plate by rivets 34. The lining may be of any suitable well known material, and provides a friction surface engageable with the adjacent surface of the pulley plate 32.

The pulley plate is disposed adjacent the open end of the drive plate 14, and serves as one wall enclosing the interior mechanism of the device. This plate 32 includes an axially extending tubular portion or hub 35 which is adapted to rotate on the sleeve 11 when the clutch is disengaged. The sleeve 11 has an outwardly extending annular flange 36, one side of which serves as an abutment surface or shoulder for a thrust bearing 37, said bearing 37 also serving as means for limiting the downward movement of the drive plate. A retaining ring 37a, received in a groove provided therefor in a longitudinally extending annular flange 32a of the pulley plate 32, holds the bearing assembly 37 in position, the opposite side of said bearing assembly being in abutment with the adjacent wall of the pulley plate within the flange 32a. It is to be noted that the hub 35 of the pulley plate is annularly recessed for reception of the flange 36 of the sleeve 35. If required, a series of shims 38 may be interposed between the bearing 37 and the adjacent end 39 of the hub 40 of the guide drive plate. A key 41 is provided in keyways in the adjacent surface of the hub 40 and the sleeve 11 to insure rotation of the drive plate therewith.

If desired, an anti-friction bearing may be provided between the extension or hub 35 of the pulley plate 32 and the sleeve 11, the inner and outer diameters of these parts being suitably spaced apart to receive a needle bearing assembly 42 which is enclosed adjacent their outer ends by a felt seal 43 which has a sealing washer 44 adjacent its outer side, secured against displacement by a retaining ring 45 clipped into a recess provided therefor in the interior surface of the hub 35 of the pulley plate.

Suitable power take-off means is provided, and, as shown, comprises a pulley 46 having a V-shaped groove 47 for reception of a V-belt or the like. The pulley is received on the hub 35 of the pulley plate and is secured thereon by a set screw 48, the pulley being positively locked against rotation on the hub 35 by means of a key 49 received in keyways provided in adjacent surfaces of said hub 35 and the pulley body 50.

Means to effect engagement of the central plate 23 with the pulley plate 32 is provided, and this means comprises a centrifugally actuated element indicated generally at 55 received in an annular space or chamber 56 defined by portions of the drive plate and central plate adjacent their peripheries.

The centrifugally actuated element 55 comprises a pair of springs 57 and 58 of substantially equal length, having their adjacent ends threadedly secured together by means of spring sections 59. The spring sections 59 have an external diameter slightly larger than the internal diameter of the springs 57 and 58, and the spring sections 59 are screwed into the adjacent ends of said springs 57 and 58. By having the springs 57 and 58 of substantially equal length and connecting them together by the spring sections 59 at diametrically opposite sides, a balanced centrifugal element is provided.

Within the springs 57 and 58 are a plurality of circumferentially spaced balls 60 of steel or other suitable material providing additional weight means for the centrifugal element so as to facilitate expansion of said centrifugal element under the influence of centrifugal force.

Spacing means is provided between adjacent balls 60 and said spacing means comprises the springs 59 and short spring sections 61 having external diameters smaller than the internal diameters of the respective springs 57 and 58. It is to be noted that the springs 61 will expand upon centrifugal enlargement of the centrifugal element and that the springs 61 are opposite-hand relative to the springs 57 and 58 to thereby prevent interlocking of the coils of the respective springs under operative conditions whereunder the coils of the respective springs separate.

The centrifugal element 55 normally rests on curved annular shoulders 62 and 63 of the drive plate and center plate respectively, said shoulders forming a seat having substantially the same contour as the adjacent surfaces of the springs 57 and 58 of the centrifugal element, and are located adjacent the radial center of the chamber 56.

The wall 64, of the drive plate 14, forming one side of the chamber 56, is perpendicular to the axis of the shaft 10 while the opposite wall of the chamber 56, defined by the wall 65 of the center plate 23, is inclined radially outwardly and toward the wall 64 of the drive plate 14, to thereby form a ramp operably engageable by the centrifugal element.

In the operation of the device hereinabove described, the drive plate 14 rotates with the shaft 10 and carries the center plate 23 with it. As the drive plate and center plate rotate, centrifugal force causes the element 55 to expand and move outwardly along the ramp 65 to effect engagement between the friction surface of the center plate lining and the adjacent surface of the pulley plate against the counter-force of the springs 31. When the speed of the rotary drive element, including the drive plate 14 and center plate 23, reaches a predetermined value, the center plate will effectively engage the driven element or pulley plate 32 to effect rotation thereof.

When the speed of the driven element and plate 23 drops below said predetermined value, the element 55 will contract sufficiently to permit the springs 31 to effect disengagement of the center plate 23 with the pulley plate 32.

I claim:

1. In power transmitting devices, comprising: a rotatable shaft; driving means so constructed and arranged as to rotate with said shaft; a driven member axially aligned with said driving means; and means so constructed and arranged as to effect a driving connection between the driving means and the driven member, said connecting means including annular coiled spring means; and a plurality of balls therein.

2. The invention defined by claim 1 wherein there is means for spacing the balls uniformly apart.

3. The invention defined by claim 1 wherein there are springs interposed between the balls for uniformly spacing them apart.

4. The invention defined by claim 1 wherein the spring means comprises a pair of coiled springs of substantially equal length having their ends connected by short springs of substantially equal size and weight; and compression springs between the balls for substantially uniformly spacing said balls apart, said last-mentioned springs being of opposite-hand relative to the first-mentioned springs.

5. In a centrifugal element: a pair of coiled springs of substantially equal length having their ends connected together so as to form a balanced annular member; a plurality of balls within the member; and compression springs uniformly spacing the balls apart, said last-mentioned compression springs being of substantially uniform size and weight, of opposite-hand relative to the annular member and of smaller diameter than the first-mentioned springs.

6. In power transmitting devices: a rotatable shaft; a driving member adapted to rotate with said shaft; a plate carried by the driving member and shiftable axially thereof; said plate and driving member having annular walls spaced from each other, one of said walls being inclined radially outwardly and toward the other wall; a driven member spaced from said plate but engageable thereby; yielding means urging the plate away from the driven member; a balanced annular centrifugally actuated element disposed within the space between the annular walls of said driving member and plate, said element comprising coiled spring means; and a plurality of balls disposed within said spring.

7. In power transmitting devices: a rotatable shaft; a driving member adapted to rotate with said shaft; a plate carried by the driving member and shiftable axially thereof; said plate and driving member having annular walls spaced from each other, one of said walls being inclined radially outwardly and toward the other wall; a driven member spaced from said plate but engageable thereby; yielding means urging the plate away from the driven member; a balanced annular centrifugally actuated element disposed within the space between the annular walls of said driving member and plate, said element comprising coiled spring means; and a plurality of balls disposed therein and annularly spaced apart.

8. In power transmitting devices: a rotatable shaft; a driving member adapted to rotate with said shaft; a plate carried by the driving member and shiftable axially thereof; said plate and driving member having annular walls spaced from each other, one of said walls being inclined radially outwardly and toward the other wall; a driven member spaced from said plate but engageable thereby; yielding means urging the plate away from the driven member; a balanced annular centrifugally actuated element disposed within the space between the annular walls of said driving member and plate, said element comprising a pair of coiled springs of substantially equal length, having adjacent ends secured together; a plurality of balls within said springs; and compressible coiled springs between the respective balls, adapted to annularly space said balls apart substantially equal distances from each other.

9. In power transmitting devices: a rotatable shaft; a driving member adapted to rotate with said shaft; a plate carried by the driving member and shiftable axially thereof; said plate and driving member having annular walls spaced from each other, one of said walls being inclined radially outwardly and toward the other wall; a driven member spaced from said plate but engageable thereby; yielding means urging the plate away from the driven member; a balanced annular centrifugally actuated element disposed within the space between the annular walls of said driving member and plate, said element comprising a pair of coiled springs of substantially equal length, having adjacent ends secured together; a plurality of balls within said springs; and compressible coiled springs between the respective balls, adapted to annularly space said balls apart substantially equal distances from each other, the last mentioned springs being of opposite-hand relative 'the first-mentioned springs.

10. In power transmitting devices, comprising: a rotatable shaft; a driving member adapted to rotate with said shaft and including a plate shiftable axially relative to the driving member, said plate and driving member having respective annular walls spaced from each other, one of said walls comprising ramp means inclined outwardly and toward the other wall; a driven member normally spaced from the plate, said driven member being rotatable on the axis of the shaft; yielding means adapted to urge the plate away from the driven means; centrifugal means adapted to cooperate with the annular walls of the driving means and the plate for urging the latter into engagement with the driven member, said centrifugal means comprising an annular coiled spring element disposed in the space between the walls of the driving member and plate; and a plurality of annularly spaced balls within said annular spring.

11. In a centrifugal element, a pair of coiled springs of substantially equal length having adjacent ends connected together so as to form a balanced annular member; a plurality of balls within said annular member; and compression springs uniformly spacing the balls apart, said last mentioned springs being of substantially uniform size and weight and of smaller diameter than the first mentioned springs.

12. In power transmitting devices, comprising: a rotatable shaft; driving means so constructed and arranged as to rotate with said shaft; a driven member axially aligned with said driving means; means so constructed and arranged as to effect a driving connection between the driving means and the driven member, said connecting means including an annular coiled spring means; a plurality of balls disposed within said annular coiled spring means; and means for uniformly spacing said balls apart.

13. The invention defined by claim 12, wherein the spacing means are resilient.

AUSTIN E. ELMORE.

REFERENCES CITED

The following references are of record in the file of this patent:

UNITED STATES PATENTS

| Number | Name | Date |
|---|---|---|
| 266,529 | Root | Oct. 24, 1882 |
| 1,387,384 | Goddard | Aug. 9, 1921 |
| 1,678,638 | Dunham | July 31, 1926 |
| 1,777,354 | Dina | May 19, 1925 |
| 1,805,692 | Ferenci | May 19, 1931 |
| 1,859,334 | Karle | May 24, 1932 |
| 1,922,931 | Defays et al. | Aug. 15, 1933 |
| 2,056,050 | Harris | Sept. 29, 1936 |
| 2,260,796 | Burns | Oct. 28, 1941 |

Certificate of Correction

Patent No. 2,491,003                                                December 13, 1949

AUSTIN E. ELMORE

It is hereby certified that errors appear in the printed specification of the above numbered patent requiring correction as follows:

Column 6, line 57, list of references cited, for "July 31, 1926" read *July 31, 1928*; line 58, for "May 19, 1925" read *Oct. 7, 1930*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*